D. CURTIS.

Lining for Horse Collar Caps and Harness.

No. 5,251. Reissued Jan. 21, 1873.

Witnesses.
C. F. Brown.
Melville Church

Inventor.
Dexter Curtis.
by his Attys.
Hill & Ellsworth.

AM. PHOTO-LITHOGRAPHIC CO. N.Y. (OSBORNE'S PROCESS.)

UNITED STATES PATENT OFFICE.

DEXTER CURTIS, OF SUN PRAIRIE, WISCONSIN, ASSIGNOR OF ONE-HALF INTEREST TO HENRY GILMAN AND GEORGE H. RICHARDS.

IMPROVEMENT IN LININGS FOR HORSE-COLLAR CAPS AND HARNESS.

Specification forming part of Letters Patent No. 105,917, dated August 2, 1870; reissue No. 5,251, dated January 21, 1873.

*To all whom it may concern:*

Be it known that I, DEXTER CURTIS, of Sun Prairie, in the county of Dane and State of Wisconsin, have invented a new and useful Horse-Collar Cap; and I do hereby declare the following to be a full, clear, and exact description of the same, reference being had to the accompanying drawing forming part of this specification, in which—

Figure 1:
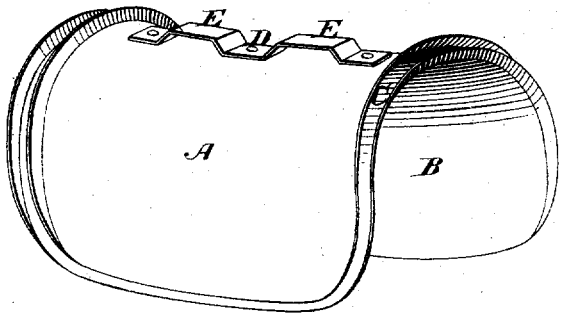
Figure 2:
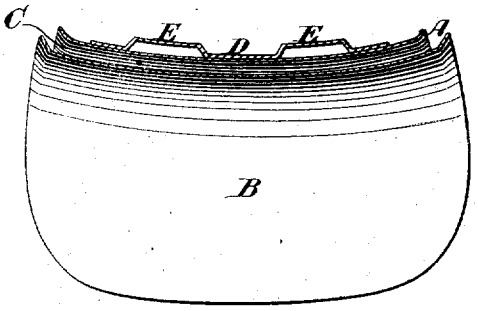

Figure 1 is a perspective view of the horse-collar cap, and Fig. 2 is a central longitudinal section of the same.

Similar letters of reference in the accompanying drawing denote the same parts.

The object of my invention is to more effectually prevent the chafing or galling of a horse by the harness, and to promote the healing of the flesh when thus galled or chafed. To these ends my invention consists, first, in a novel and peculiar construction of a collar-cap, in order to provide for the circulation of air through the structure of the cap, as hereinafter described; and, secondly, in the application of a zinc lining to such parts of the harness as are liable to produce the gall or chafe, said lining being composed of a smooth continuous metal sheet or plate struck up or otherwise formed to the shape of the harness where it is to be applied, and having a zinc surface in contact with the flesh of the horse.

Horse-collar caps have heretofore been constructed of a curved metal top plate, and a leather strip secured to the under side of the same in such a manner as to leave an air-passage between them. When the leather becomes moistened by contact with the neck it stretches to such an extent, under the weight of the collar, as to close the air-passage and prevent the escape of moisture. The leather, therefore, becoming continually moist, is liable to chafe the neck rather than prevent such injury.

By constructing the lower part of a smooth sheet or plate of metal, as I propose, it can neither yield under the weight of the collar to close the air-passage, nor become sticky and abraded to chafe the neck.

In the accompanying drawing, A is a plate, composed of iron, copper, or other suitable metal, bent in the arc of a circle, as shown, and secured firmly at its side edges to a second curved metal plate, B, which is cut shorter than the plate A, thus leaving a space, C, between the two for the circulation of air. The lower plate is extended somewhat beyond the ends and sides of the upper plate, and bent up slightly, so as to rest firmly upon the horse's neck without cutting or galling the same.

The cap is applied by being placed upon the neck of a horse, and the two ends of the collar buckled together over the plate A.

For the purpose of securing the collar firmly to the cap, the plate A is provided, upon its upper surface, with a longitudinal strap, D, of leather or metal, so connected to said plate as to form two or more loops, E, through which the straps upon the ends of the collar are passed.

In carrying into practice the second part of my invention in connection with this particular part of a harness, it is only necessary that the lower plate B, which comes in contact with the flesh of the horse, be made of zinc, or have its under surface covered with zinc, so as to present a zinc surface to the flesh of the horse.

The zinc lining has both a mechanical and chemical effect, and has a tendency to prevent and also cure chafing and galls. The mechanical effect consists in the exclusion of the air and organic germs by the impervious surface, and also in presenting a smooth metallic surface to the flesh of the horse. The chemical, and most important, effect is caused by the action of the zinc plate upon the acid and saline constituents of the moist animal muscle and fluids, resulting in the production of oxide, carbonate, lactate, and other compounds of zinc. This chemical action is accomplished and very much increased by the local galvanic action occasioned by the contact of the impure commercial zinc with the moist saline and acidulous flesh. The zinc salts, by their astringency, promote the healing of injured parts; and, by their antiseptic properties, tend to destroy the injurious organic germs previously adherent to, or which might at any time attach themselves to, the exposed wounds. The chemical action, and therefore the antiseptic effect, will be greatest at the edges of the wound, where its aid would be most needed, because at this point there would be the least mechanical protection and the greatest exposure to the air. In applying the zinc lining, therefore, to any part of the harness it is only necessary that the plate, sheet, or surface of zinc should be formed sufficiently large to present a continuous smooth surface over the parts to be protected so as to cover the edges of the wound, if any should be made, and so as to conform in shape to the part of the harness to which such lining is to be applied.

Having thus described my invention, what I claim as new is—

1. The horse-collar cap, consisting of the curved metal plates A B, secured together substantially as described, so as to leave an air-passage between them, for the purposes specified.

2. A lining for the parts of a harness, struck up or otherwise formed in one piece from sheet or plate metal having a zinc surface, and shaped to the part of the harness to which it is to be applied, substantially as described, for the purposes specified.

Witnesses: DEXTER CURTIS.
E. A. ELLSWORTH,
L. HILL.